US012594803B1

(12) United States Patent
Duley et al.

(10) Patent No.: US 12,594,803 B1
(45) Date of Patent: Apr. 7, 2026

(54) SMART AIRBAG SUSPENSION SYSTEMS

(71) Applicant: PACCAR Inc, Bellevue, WA (US)

(72) Inventors: William Robert Duley, Mount Vernon, WA (US); Peter Britanyak, Burlington, VA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 19/184,185

(22) Filed: Apr. 21, 2025

(51) Int. Cl.
B60G 13/14 (2006.01)
B60G 17/06 (2006.01)

(52) U.S. Cl.
CPC ............. B60G 13/14 (2013.01); B60G 17/06 (2013.01); B60G 2202/242 (2013.01)

(58) Field of Classification Search
CPC ... B60G 13/14; B60G 17/06; B60G 2202/242
See application file for complete search history.

(56) References Cited

U.S. PATENT DOCUMENTS

| | | | | |
|---|---|---|---|---|
| 9,446,648 | B2 * | 9/2016 | Allen ......................... | F16F 9/56 |
| 10,465,763 | B2 * | 11/2019 | Bounds .................. | B60G 11/27 |
| 2007/0257833 | A1 * | 11/2007 | Nordmeyer ........... | G01S 13/758 |
| | | | | 340/686.2 |
| 2008/0174056 | A1 * | 7/2008 | Egolf .................... | F16F 9/0454 |
| | | | | 267/64.11 |

| | | | | |
|---|---|---|---|---|
| 2009/0302514 | A1 * | 12/2009 | Grabarz ................. | B60G 11/28 |
| | | | | 267/66 |
| 2010/0252970 | A1 * | 10/2010 | Leonard .................. | F16F 9/057 |
| | | | | 267/64.27 |
| 2014/0095025 | A1 * | 4/2014 | Gambrall ............. | B60G 17/018 |
| | | | | 701/37 |
| 2015/0008627 | A1 * | 1/2015 | Leonard ................. | B60G 13/04 |
| | | | | 267/64.24 |
| 2015/0367700 | A1 * | 12/2015 | Allen ..................... | F16F 9/0472 |
| | | | | 280/124.16 |
| 2018/0029432 | A1 * | 2/2018 | Kondo ............... | B60G 17/0162 |
| 2019/0255903 | A1 * | 8/2019 | Hirao ...................... | B60G 17/08 |
| 2020/0238782 | A1 * | 7/2020 | Vaughan ................. | F15B 1/08 |
| 2020/0317018 | A1 * | 10/2020 | Nong ...................... | G05D 1/027 |
| 2021/0039469 | A1 * | 2/2021 | Vaughan ............ | B60G 17/0525 |

* cited by examiner

*Primary Examiner* — Toan C To

(57) ABSTRACT

A vehicle suspension system that includes a smart airbag is described. The airbag includes a time-of-flight (ToF) sensor located proximal to a first end of the airbag. The ToF sensor emits a signal towards a second end of the airbag opposite the first end along a longitudinal axis, and detects a reflection of the signal. The ToF sensor outputs a value indicating the distance between the first end and the second end based on an elapsed time between the time at which the signal was emitted and the time at which the reflection was detected. The ToF sensor may be located inside or outside the airbag. In the latter case, the ToF sensor emits and detects the signal through a transparent window in the airbag. A computing device receives one or more values from the ToF sensor and determines a vehicle characteristic based on the value(s).

20 Claims, 4 Drawing Sheets

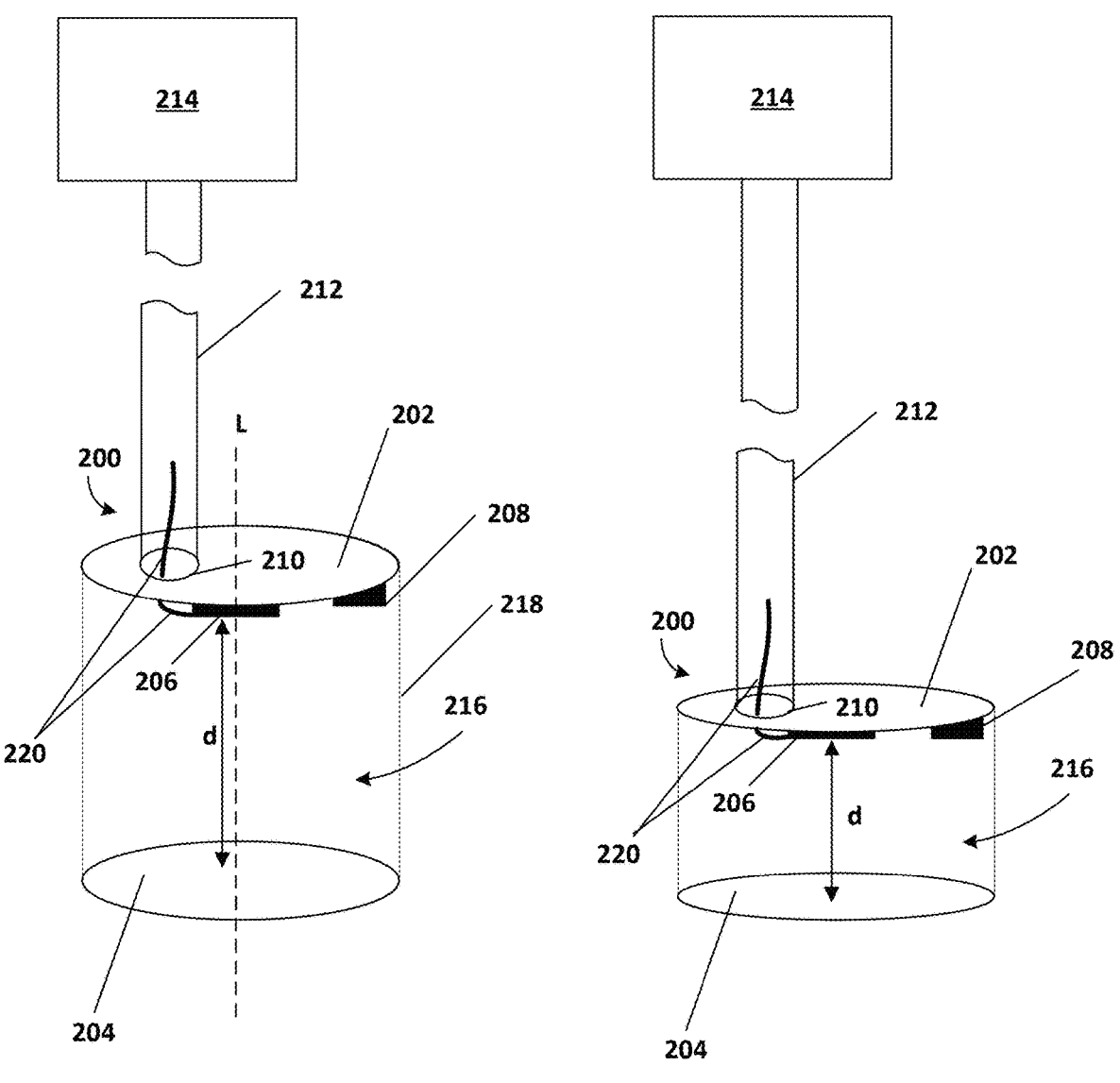
FIG. 2A            FIG. 2B

SMART AIRBAG SUSPENSION SYSTEMS

BACKGROUND

Air shock suspension systems for vehicles (such as heavy-duty trucks) use enclosed airbags filled with compressed air to absorb road impacts and improve vehicle handling. It is with respect to this general technical environment that aspects of the present disclosure are directed.

SUMMARY

In an example, a suspension system for a vehicle is described. The suspension system includes: an airbag having a first end and a second end opposite the first end along a longitudinal axis of the airbag; and a time-of-flight (ToF) sensor configured to: emit, at a first time, a signal from a location proximal to the first end of the airbag into an internal cavity of the airbag, detect a reflection of the signal at a second time, and output a value representing a distance between the first end and the second end based on an elapsed time between the first time and the second time. In some examples, the ToF sensor is located inside the internal cavity.

In some examples, the ToF sensor is located external to the internal cavity, and the suspension system further includes: a transparent window configured in the first end of the airbag, where the ToF sensor is mounted such that it emits the signal through the transparent window into the internal cavity.

In some examples, the transparent window and the ToF sensor are enclosed in an enclosure.

In some examples, the suspension system further includes: a pressure sensor located inside the internal cavity and configured to: detect a pressure inside the airbag, and output a pressure value representing the pressure.

In some examples, the suspension system further includes: a wire coupled to the ToF sensor and to a communication bus of the vehicle, where the ToF sensor is configured to output the value via the wire.

In some examples, the airbag is coupled to a compressor via a coupler that forms an airtight seal with the airbag.

In some examples, the ToF sensor is located inside the airbag, and the suspension system further includes: a wire coupled to the ToF sensor and to a communication bus of the vehicle, the wire exiting the airbag via the coupler, where the ToF sensor is configured to output the value via the wire.

In some examples, the value is the elapsed time.

In another example, a vehicle is described. The vehicle includes: a computing device; a chassis; an axle; a first airbag having a first top end coupled to the chassis and a first bottom end coupled to the axle; and a first time-of-flight (ToF) sensor configured to: periodically emit a first signal at the first top end or the first bottom end of the first airbag, detect a corresponding first reflection for each emitted first signal, and output, to the computing device, a first plurality of values representing a plurality of distances between the first top end and the first bottom end of the first airbag based on corresponding elapsed times between when each first signal was emitted and when the corresponding first reflection was detected, where the computing device is configured to determine a characteristic of the vehicle based at least in part on one or more values of the first plurality of values.

In some examples, determining the characteristic of the vehicle includes determining a distance rate of change between the first top end and the first bottom end of the first airbag.

In some examples, the computing device is further configured to cause an adjustment to an air pressure of the first airbag based at least in part on the determined characteristic.

In some examples, the vehicle further includes a pressure sensor configured to: detect a first pressure corresponding to a pressure inside the first airbag, and output, to the computing device, a pressure value representing the first pressure, where determining the characteristic of the vehicle includes determining a mass of the vehicle further based at least in part on the pressure value.

In some examples, the vehicle further includes: a second airbag having a second top end coupled to the chassis and a second bottom end coupled to the axle; and a second ToF sensor configured to: periodically emit a second signal at the second top end or the second bottom end of the second airbag, detect a corresponding second reflection for each emitted second signal, and output, to the computing device, a second plurality of values representing distances between the second top end and the second bottom end of the second airbag based on corresponding elapsed times between when each second signal was emitted and when the corresponding second reflection was detected, where the computing device is configured to determine the characteristic of the vehicle further based at least in part on the second plurality of values.

In some examples, the plurality of values includes the elapsed times.

In some examples, the first ToF sensor is configured to output the first plurality of values to the computing device via a communication bus of the vehicle.

In some examples, the vehicle further includes a compressor coupled to the first airbag and configured to adjust an air pressure of the first airbag.

In some examples, the computing device is configured to determine the plurality of distances based on the first plurality of values.

In another example, a suspension system for a vehicle is described. The suspension system includes: an airbag having a first end and a second end opposite the first end along a longitudinal axis of the airbag, where the first end includes a transparent window; and a time-of-flight (ToF) sensor configured to: emit a signal through the transparent window into an internal cavity of the airbag at a first time, detect a reflection of the signal at a second time, and output a value representing a distance between the first end and the second end based on an elapsed time between the first time and the second time.

In some examples, the transparent window and the ToF sensor are enclosed together within an enclosure that is configured to keep contaminants out of the enclosure.

BRIEF DESCRIPTION OF THE DRAWINGS

Non-limiting and non-exhaustive examples are described with reference to the following figures:

FIGS. 2A-2B depict a smart airbag according to some examples.

DETAILED DESCRIPTION

Figure 1A:
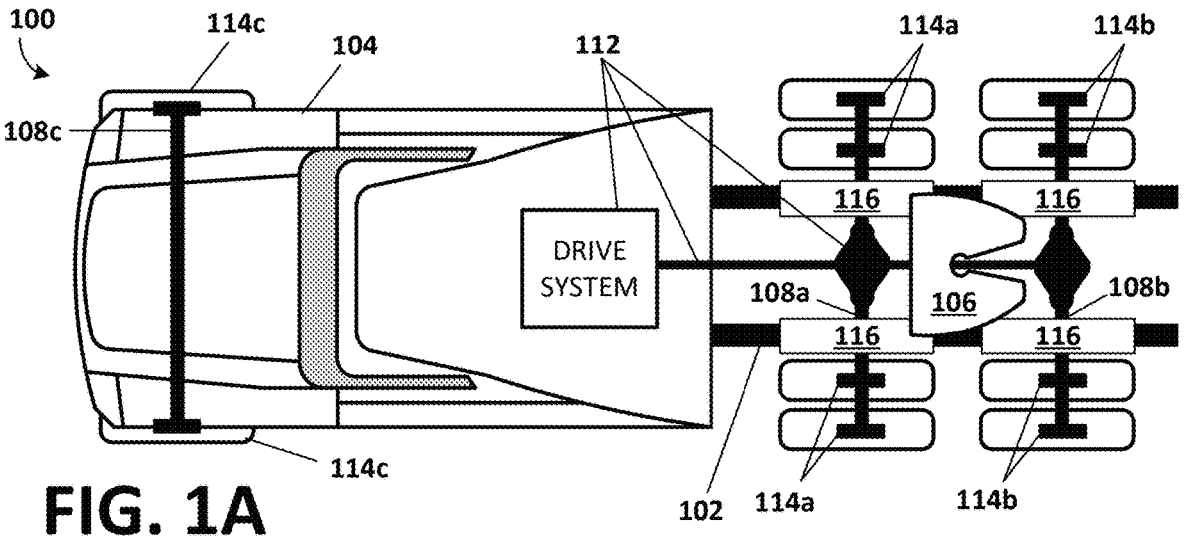
FIGS. 1A-1B depict vehicles that include air shock suspension systems according to some examples.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. The following detailed description is, therefore, not to be taken in a limiting sense.

Air shock suspension systems for vehicles (such as heavy-duty trucks) use enclosed airbags filled with compressed air to absorb road impacts and improve vehicle handling. Each airbag is coupled between the vehicle chassis (e.g., the frame of the vehicle) and a wheel axle. There may be one airbag per wheel (or per pair of wheels), for example, or a vehicle suspension system may use airbags for some wheels and traditional shocks for other wheels. As an airbag compresses and extends due to bumps or turns in the roadway, the distance between the chassis and the axle changes. Changes in the distance between the chassis and the axle can provide an indication of the behavior and performance of the suspension system, and this information can be used to tune the suspension (such as by adjusting the amount of air in the airbag(s)) and/or identify malfunctions in the suspension or other vehicle components (such as tires). Thus, some vehicles are equipped with a mechanism for monitoring the change in distance between the chassis and the axle. One such mechanism is a suspension potentiometer, which uses a system of linkages attached between the chassis and the axle to measure the linear displacement of the suspension. This approach has several disadvantages, however. For example, the potentiometer is exposed to dust, water, and road debris, and requires regular maintenance (e.g., cleaning and lubrication). The potentiometer consumes non-negligible weight and space on the vehicle and can require calibration or optimization to function effectively.

As described herein, a smart airbag suspension system can incorporate a time-of-flight (ToF) sensor to detect the distance between the top of the airbag and the bottom of the airbag, thereby providing an indication of the distance between the chassis and the axle. In general, a ToF sensor emits a signal, such as a light or ultrasound signal, and detects the reflection of the signal. Based on the elapsed time between the emission of the signal and the detection of the reflection, along with a known transmission speed of the signal, the distance between the sensor and the surface reflecting the signal can be determined. In some examples, a ToF sensor is located inside an airbag at the top or the bottom of the airbag and senses the distance between the top and bottom of the airbag by emitting a signal inside the airbag that is reflected by an opposite interior surface of the airbag. In this case, the sensor is protected from dirt, water, and road debris by virtue of being enclosed in the airbag. Alternatively, a ToF sensor can be located outside of the airbag. In this case, the top or the bottom of the airbag includes a transparent window, and the ToF sensor is mounted in a position that enables the sensor to transmit the signal through the window and receive the reflection through the window. In some cases, the ToF sensor and the window are both enclosed by an outer cover or other material to protect them from contaminants.

Additional details regarding smart airbag suspension systems are described with reference to FIGS. 1A-4.

Figure 1B:
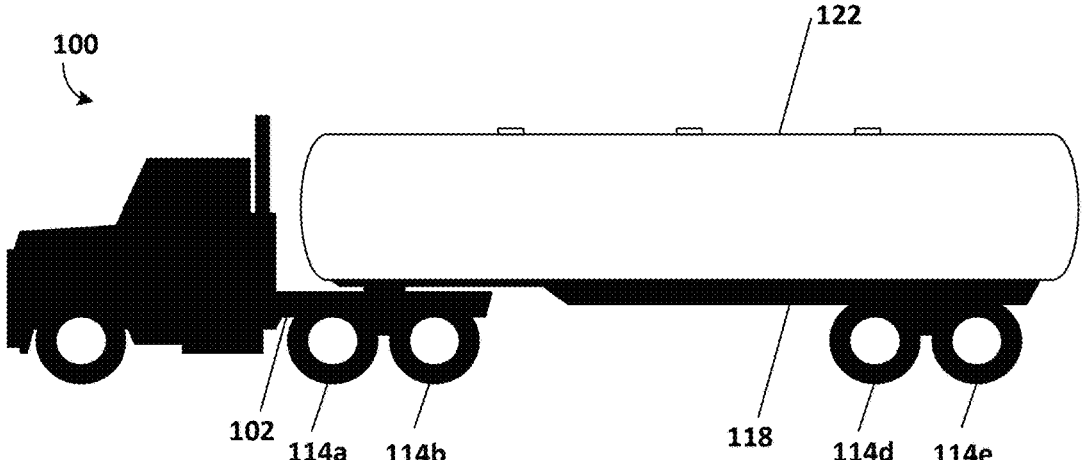

FIGS. 1A and 1B are schematic diagrams of an example vehicle 100 in which smart airbag suspension systems may be used according to examples of the present disclosure. In some implementations, the vehicle 100 is a truck, such as a Class 8 truck. However, the methods and systems can be used by vehicles of different types and/or sizes. For instance, aspects of the disclosed subject matter may have wide application and, therefore, may be suitable for use with other types of vehicles, such as passenger vehicles, buses, light-, medium-, and heavy-duty vehicles, motor homes, etc. Accordingly, the following descriptions and illustrations herein should be considered illustrative in nature and, thus, not limiting of the scope of the claimed subject matter.

As depicted in FIG. 1A, the vehicle 100 includes a cabin (referred to herein as cab 104) mounted to a chassis 102 that serves as a main support structure for the vehicle 100. In some examples, a driver may occupy the cab 104 to operate/drive the vehicle 100. In other examples, the vehicle 100 has autonomous driving capabilities and does not include a driver. The chassis 102 may include a plurality of frame rails and crossmembers. In some examples, the chassis 102 can be connected to a trailer by a trailer coupling 106, such as, for example, a "fifth wheel," to form a tractor-trailer combination. FIG. 1B depicts an example of the vehicle 100 connected to a trailer 122 to form a tractor-trailer combination.

In examples, the vehicle 100 includes one or more axles 108a-108c (collectively, axles 108) coupled to at least one pair of wheels 114a-114c (collectively, wheels 114) onto which tires are mounted that interact with a driving surface. In an example 6×4 configuration, two of the axles 108a, 108b are drive axles that are powered by a drive system 112 to propel the vehicle 100. In some implementations, and as depicted in FIG. 1A, each drive axle 108a, 108b may be coupled to two pairs of wheels 114 (e.g., one pair on a left side of the vehicle 100 and one pair on a right side of the vehicle); however, in other examples, other wheel and drive configurations are contemplated. The drive system 112 includes various components that generate power and transmit the power to the drive axles 108a, 108b. For instance, the drive system 112 includes various components, such as at least one power source, such as an internal combustion engine and/or battery and electric motor, transmission, and differentials. In some implementations, the drive axles 108a, 108b are electric axles (e-axles) that have an electric motor integrated in or connected to the axles that transmit torque to the wheels 114 to propel the vehicle 100 forward or backward. The electric motors may have an integrated transmission and be used alone to power the wheels 114, or be used in combination with a mechanical drivetrain, where the power is transmitted from the power source to the wheels 114 through a combination of gears, driveshafts, and differentials. In some examples, the drive axles 108a, 108b may include an electric motor operatively connected to a left side and another electric motor operatively connected to a right side of each axle such that torque may be controlled separately to each side of the drive axles 108a, 108b.

In examples, the vehicle 100 further includes a suspension system 116 including various components that connect the chassis 102 to one or more of the axles 108. The suspension system 116 may include linkages and one or a combination of spring suspension components, air shocks (e.g., airbags), and equalizing beam components that stabilize the vehicle 100, cushion the chassis 102 (and vehicle occupants) from an irregular road surface (e.g., absorb shocks and vibrations from the road), and maintain proper axle 108 spacing and alignment relative to the chassis 102. In examples, the design of the suspension system 116 may provide isolation of motion of the chassis 102 from the wheels 114 and axles 108 (e.g., that would otherwise be transferred from the wheels 114 to the chassis 102) while maintaining stability of the vehicle 100 and providing desirable handling characteristics. In some implementations, the suspension system 116 includes one or more smart airbags, described in more detail with references to FIGS. 2A, 2B, and 3.

Although FIG. 1A depicts the suspension system 116 of a standalone vehicle 100, it should be understood that a vehicle may include a trailer 122 (as shown in FIG. 1B) that may similarly be equipped with a suspension system that includes one or more airbags coupled between a chassis 118 of the trailer 122 and an axle of the trailer (not shown). Thus, references herein to a vehicle that includes airbags should be construed to encompass a standalone vehicle that includes airbags, a vehicle-trailer combination that includes airbags, and a standalone trailer that includes airbags.

FIGS. 2A-2B depict a smart airbag 200 that may be coupled between a chassis of a vehicle (e.g., chassis 102, 118) and an axle of the vehicle (e.g., axle 108) as part of a suspension system (e.g., suspension system 116). FIG. 2A depicts the airbag 200 in an uncompressed state and FIG. 2B depicts the airbag 200 in a compressed state.

The airbag 200 has a first end 202 and an opposing second end 204 along a longitudinal axis L that intersects both the first end 202 and the second end 204. The first end 202 and the second end 204 are separated by a distance d. The distance d varies as the airbag 200 extends and compresses in response to the wheels of the vehicle traversing bumps in the road surface and as the vehicle turns or accelerates. The first end 202 may be coupled to a chassis of the vehicle and the second end 204 may be coupled to an axle of the vehicle, or vice versa. If the first end 202 is coupled to the chassis of the vehicle it may be referred to as the top end of the airbag 200 and the second end 204 may be referred to as the bottom end of the airbag 200 because in this case the first end 202 would be above the second end 204 when the airbag 200 is installed in the vehicle and the vehicle is upright.

The airbag 200 includes an internal cavity 216 that is enclosed by the first end 202, the second end 204, and one or more sides 218 of the airbag 200. In some examples, the first end 202 and the second end 204 are formed of a rigid material and the side(s) 218 of the airbag 200 are formed of a flexible material that deforms (e.g., changes shape) as the airbag 200 compresses and extends. The internal cavity 216 is filled with compressed air received from a compressor 214 through a tube 212 (e.g., a pipe or hose) that is connected to the compressor 214 and to the airbag 200 via an air supply coupler 210 that makes an airtight seal with the internal cavity 216 of the airbag 200. The internal cavity 216 is generally airtight other than exposure of the internal cavity through tube 212 to compressor 214. In the example of FIGS. 2A-2B, the air supply coupler 210 is located in the first end 202 of the airbag 200. In other examples, the air supply coupler 210 may be located in the second end 204 or in a side 218 of the airbag 200.

In the examples of FIGS. 2A-2B, the airbag 200 includes a ToF sensor 206 located inside the internal cavity 216. The ToF sensor 206 may be at a location that is proximal to (e.g., attached or connected to an internal surface of) the first end 202. For example, the ToF sensor 206 may be mounted to an internal (cavity-facing) surface of the first end 202 or to a side 218 of the airbag at a location that is near the first end 202. The ToF sensor 206 is configured to emit a signal at a first time, detect a reflection of the signal from a surface at a second time, and determine an elapsed time between the first time and the second time. The elapsed time can be used along with a known propagation speed of the signal to determine a distance between the ToF sensor 206 and the reflecting surface. For example, a ToF sensor 206 located at the first end 202 may be configured to emit a signal directed towards the second end 204 of the airbag 200 and detect a reflection of the signal off the second end 204 of the airbag 200. The elapsed time between the emission of the signal and the detection of the reflection can be used to determine (e.g., calculate, estimate) the distance d between the first end 202 and the second end 204 using the equation d=(1/2) st, where s is the known or estimated propagation speed of the signal and t is the elapsed time between when the signal was emitted by the ToF sensor 206 and when the reflection of the signal was detected by the ToF sensor 206. In some examples, the second end 204 of the airbag 200 includes a reflective material on an inner surface of the second end 204 to increase the strength of the reflected signal.

The ToF sensor 206 outputs a value representing the distance d between the first end 202 and the second end 204. The ToF sensor 206 may output the value to a computing device of the vehicle (e.g., a vehicle control unit), for example. In some examples, the value may be the elapsed time between when the signal was emitted by the ToF sensor 206 and when the reflection of the signal was detected by the ToF sensor 206. In other examples, the ToF sensor 206 may include processing circuitry and may use the elapsed time to calculate the distance d. In this case, the value that is output by the ToF sensor 206 may be the distance d. In examples, the value representing the distance d may be output to a controller area network (CAN) bus of the vehicle for other vehicle systems to use in various applications to monitor or control operation of the vehicle.

In general, the distance d may provide a representation or estimation of the distance between the chassis and the axle when the airbag 200 is mounted vertically between the chassis and the axle. In some cases, however, an airbag 200 may be mounted between the chassis and the axle at an angle. In this case, the distance d between the first end 202 and the second end 204 does not directly represent the distance between the chassis and the axle but can be used to determine the distance between the chassis and the axle using basic geometric principles.

The ToF sensor 206 may emit and detect optical, electromagnetic, or ultrasonic signals. The propagation speed for optical and electromagnetic signals can be assumed to be c (the speed of light in a vacuum), while the propagation speed for ultrasonic signals may vary based on ambient temperature and other factors but can be estimated as a known value.

The ToF sensor 206 may output the value via wireless transmission or via a wire 220 that is coupled to the ToF sensor 206 and to a communication bus of the vehicle (depicted in FIG. 4), such as a controller area network (CAN) bus, a local interconnect network (LIN) bus, or an Ethernet bus. The communication bus may be connected to a computing device of the vehicle. In the depicted example, the wire 220 exits the internal cavity 216 of the airbag 200 via an airtight coupler that may be located in the first end 202, the second end 204, or a side 218 of the airbag 200. In some examples, the wire 220 exits the internal cavity 216 of the airbag 200 via the air supply coupler 210. In some examples, the wire 220 exits internal cavity 216 via air supply coupler 210, but external to tube 212. In other examples, the wire 220 may be electrically connected to an interior connection point of air supply coupler 210, and an electrical pathway may be integrally formed in the air supply coupler 210 between the internal connection point and an external connection point. A separate wire (or other electrical pathway) may then be defined from the external connection point of the air supply coupler 210 to a communication bus of the vehicle. In other examples, wire 220 may extend an exterior wall of the airbag 200 separate from the air supply coupler.

In some cases, liquid condensation may accumulate inside the bottom of airbag 200, which may slightly change the distance d determined using the ToF sensor 206 (since the signal is reflected off the liquid rather than off the end of the airbag 200). Thus, the values output by the ToF sensor 206 may be adjusted (e.g., by the ToF sensor 206 or by a computing device) to compensate for this difference based on a calibration of the ToF sensor 206. For example, the ToF sensor 206 may be calibrated to account for liquid accumulating in an end of the airbag 200 by bleeding all of the air out of the airbag 200 (or out of the full suspension system) and re-zeroing the ToF sensor 206 relative to the surface of the liquid. Other calibration approaches are contemplated.

In some examples, the ToF sensor 206 periodically emits a signal, detects a corresponding reflection of the signal, and outputs a value representing the distance d based on the elapsed time between emitting each signal and detecting the corresponding reflection. The ToF sensor 206 may periodically emit and detect the signals at regularly spaced time intervals, intermittently, and/or in response to a trigger, such as in response to a request from a computing device and/or in response to a power up condition. In this manner, the ToF sensor 206 in each airbag 200 of the vehicle may produce a time series of values that can be used, by the computing device, to monitor the behavior and performance of the suspension system (including the airbags 200) and/or to determine other vehicle characteristics. Determining such vehicle characteristics may include, for example, determining that an airbag has reached an end-of-travel condition, determining the distance rate of change of an airbag, determining that an airbag is malfunctioning, determining that a load in the vehicle has shifted, and/or determining a mass of the vehicle, each of which is discussed below.

For example, the computing device can determine, based on one or more of the values produced by one or more ToF sensors 206, that one or more of the airbags 200 has reached an end-of-travel condition in which the airbag 200 is either fully compressed or fully extended, and/or has reached the end-of-travel condition a threshold number of times over a measurement period (e.g., over a trip and/or over a predetermined driving time period). Reaching an end-of-travel condition can be disadvantageous, as the airbag 200 is no longer providing the desired damping effect in the direction of the end-of-travel condition. Such information can be used by the vehicle (or by an operator of the vehicle) to adjust (e.g., increase or decrease) the amount of compressed air provided to one or more of the airbags 200 to decrease the likelihood and/or frequency of the airbag 200 reaching an end-of-travel condition. For example, the computing device may cause adjustment of the air pressure in the airbag by causing the compressor to provide additional air to the airbag 200. In examples, such adjustments are made automatically by an electronic control unit (e.g., a vehicle control unit) of the vehicle and based at least in part on the value output by sensor(s) 206 indicative of the distance d.

As another example, the computing device can determine, based on the values received from one or more ToF sensors 206, that the distance rate of change (e.g., the rate at which the distance d is changing) of one or more of the airbags 200 exceeds a threshold distance rate of change, indicating that the ride may be too bouncy. Again, the vehicle and/or operator may use this information to adjust the amount of compressed air provided to the airbags 200 (or for other purposes). In examples, such adjustments are made automatically by an electronic control unit of the vehicle and based at least in part on the value output by sensor(s) 206 indicative of the distance d.

As yet another example, the computing device can determine, based on the values received from one or more ToF sensors 206, that one of the airbags 200 is malfunctioning and/or that a load of the vehicle has shifted (e.g., inside the trailer). For example, the computing device may compare one or more values received from a first ToF sensor of a first airbag on the vehicle with one or more values received from a second ToF sensor of a second airbag on the vehicle. If the value(s) received from the first airbag are significantly different from the values received from the second airbag, one of the airbags may be malfunctioning (e.g., the airbag may be leaking air) or a load of the vehicle may have shifted.

In some examples, the airbag 200 may also include a pressure sensor 208, which may be located in the internal cavity 216 of the airbag 200 (as shown in FIGS. 2A-2B) or may be located elsewhere along the supply line between the airbag 200 and the compressor 214. The pressure sensor 208 is configured to detect (e.g., measure) a pressure corresponding to the pressure inside the airbag 200. If the pressure sensor 208 is located inside the internal cavity 216, the pressure sensor 208 directly measures the pressure inside the internal cavity 216. If the pressure sensor 208 is located elsewhere in the supply line between the internal cavity 216 and the compressor 214 (e.g., in tube 212, at air supply coupler 210, or at an output of the compressor 214), the pressure sensor 208 measures the pressure at that location, which is essentially equal to the pressure in the internal cavity 216.

The pressure sensor 208 outputs a pressure value representing the pressure inside the airbag 200. Like the ToF sensor 206, the pressure sensor 208 may be coupled with a communication bus of the vehicle (e.g., via a wire, not shown, that exits the internal cavity 216 of the airbag 200 such as via air supply coupler 210) and may output the pressure value(s) to the communication bus. The computing device may receive the pressure value(s) from the pressure sensor 208 and may use the pressure value(s) in conjunction with the value(s) representing the distance d to determine a characteristic of the vehicle, such as a mass of the vehicle. For example, the computing device may use a pressure value and a corresponding value representing a distance d to estimate a mass of the vehicle based on the idea that, at a given pressure, the change in the distance d that results from the vehicle compressing the airbag relative to the distance d when the airbag is uncompressed is a function of the mass of the vehicle. In this case, the value representing the distance d may be produced and/or measured at approximately the same time as the pressure value is produced and/or measured, such as within. 5, .75, or 1 seconds of the time at which the pressure value is produced and/or measured.

In examples, there may be several advantages of an airbag 200 having a ToF sensor 206 inside the airbag 200 (as depicted in FIGS. 2A-2B) relative to existing solutions based on the use of potentiometers. For example, the ToF sensor 206 is enclosed in the airbag 200 and thus is not exposed to contaminants. The ToF sensor 206 is also cheaper and smaller than a potentiometer and does not require a significant calibration effort or ongoing maintenance, among other things.

As discussed with reference to FIG. 3, it is possible to achieve similar advantages using a ToF sensor that is located outside of the internal cavity of the airbag.

Figure 3:
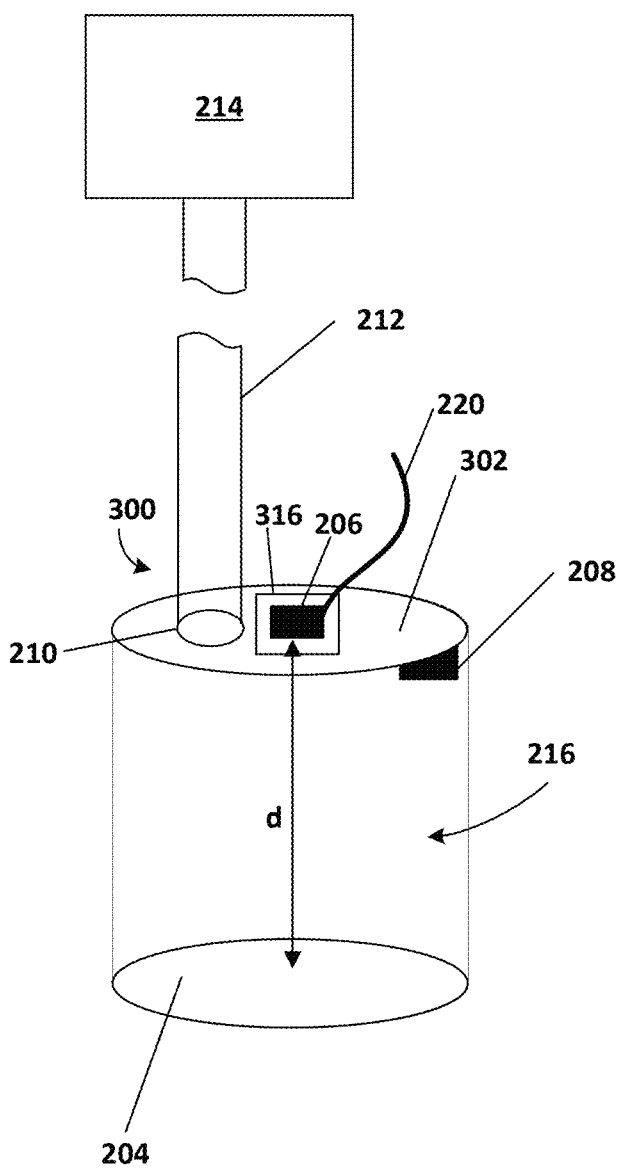
FIG. 3 depicts a smart airbag according to some examples.

FIG. 3 depicts a smart airbag 300 that may be coupled between a chassis of a vehicle (e.g., chassis 102, 118) and an axle of the vehicle (e.g., axle 108) as part of a suspension system (e.g., suspension system 116). FIG. 3 depicts the airbag 300 in an uncompressed state.

Airbag 300 is similar to airbag 200 (and includes some of the same elements), but instead of having the ToF sensor 206 located inside the internal cavity 216 of the airbag 300, the ToF sensor 206 is located outside the airbag 300 (e.g., external to the internal cavity 216). In this example, a first end 302 of the airbag 300 includes a transparent window 316 that is light-transmissible and provides a view through the first end 302 into the internal cavity 216. For example, the transparent window 316 may be formed of transparent glass or transparent plastic. The ToF sensor 206 is mounted to the airbag 300 (e.g., external to the internal cavity 216) proximal to the first end 302 of the airbag 300 and in a position that enables the ToF sensor 206 to emit a signal through the transparent window 316 into the internal cavity 216 towards the second end 204 and detect a corresponding reflection through the transparent window 316. For example, the ToF sensor 206 may be mounted above, adjacent to, or on the transparent window 316. In examples, the transparent window 316 forms part of the first end 302 of the airbag 300.

In some examples, to protect the ToF sensor 206 and transparent window 316 from contaminants, the ToF sensor 206 and transparent window 316 are enclosed together. For example, the ToF sensor 206 and transparent window 316 may be enclosed in an enclosure made of a rigid or flexible material (e.g., epoxy, rubber, metal, plastic, or other material) that is configured to keep contaminants (such as dirt and/or water) out of the enclosure. In examples, the enclosure may comprise a cover that protects the ToF sensor 206 from exposure to contaminants, and the sensor may be attached to the transparent window 316 via epoxy or otherwise. In some examples, the enclosure is mounted to, or integral with, the airbag 300. For example, the enclosure may be a housing that is attached to, or forms part of, the first end 302 of the airbag 300. This approach may yield similar advantages to the approach shown in FIGS. 2A-2B but eliminates the need for the wire 220 to exit the air-tight internal cavity 216 (since the ToF sensor 206 is already located outside of the cavity).

Figure 4:
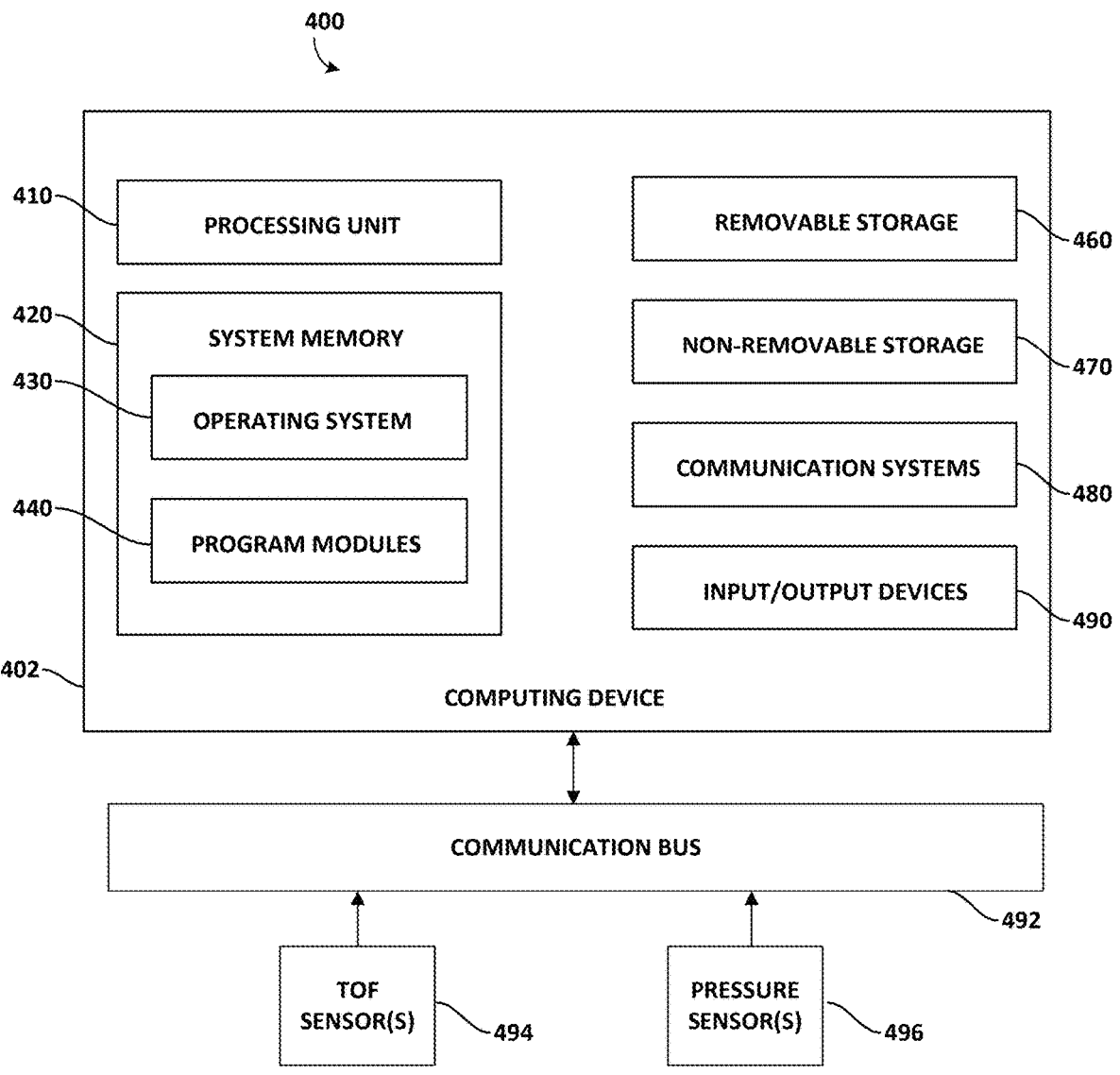
FIG. 4 depicts portions of a smart airbag system according to some examples.

FIG. 4 is a block diagram of a system 400 that may be used to implement a smart airbag suspension system according to an example. The system 400 may be included in a vehicle such as vehicle 100. The system 400 includes a computing device 402, a communication bus 492, one or more ToF sensors 494, and (optionally) one or more pressure sensors 496.

The computing device 402 is communicatively coupled to the communication bus 492. The communication bus 492 may be a CAN bus, a LIN bus, an Ethernet bus, or another type of communication bus. The ToF sensor(s) 494 and optional pressure sensor(s) 496 are also communicatively coupled to the communication bus 492 and may be configured to output values onto the communication bus 492 as described with reference to FIGS. 2A-3. The computing device 402 receives such values from the ToF sensor(s) 494 and/or pressure sensor(s) 496 via the communication bus 492.

The computing device 402, or various components and system of the computing device 402, may be an example of a computing device described with reference to FIGS. 1A-3. In examples, the computing device 402 comprises a vehicle control unit of a vehicle, such as a vehicle control unit of vehicle 100. As shown in FIG. 4, the physical components (e.g., hardware) of the computing device 402 are illustrated and these physical components may be used to practice the various aspects of the present disclosure.

The computing device 402 may include at least one processing unit 410 (e.g., a processor and/or other type of processing circuitry) and a system memory 420. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 402 and one or more program modules 440. The program modules 440 may be responsible for determining one or more distances d between a first end and a second end of one or more airbags and/or determining a characteristic(s) of a vehicle according to the various examples of the present disclosure. A number of different program modules and data files may be stored in the system memory 420. While executing on the processing unit 410, the program modules 440 may perform the various processes described above.

The computing device 402 may also have additional features or functionality. For example, the computing device 402 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip where each or many of the components of the computing device 402 may be integrated onto a single integrated circuit. Such a system-on-a-chip device may include one or more processing units, graphics units, communications units, system virtualization units and various application functionality all of which are integrated (or "burned") onto the chip substrate as a single integrated circuit.

When operating via a system-on-a-chip, the functionality, described herein, may be operated via application-specific logic integrated with other components of the computing device 402 on the single integrated circuit (chip). The disclosure may also be practiced using other technologies capable of performing logical operations such as, for example, AND, OR, and NOT, including but not limited to mechanical, optical, fluidic, and quantum technologies.

The computing device 402 may include one or more communication systems 480 that enable the computing device 402 to communicate with other electronic devices such as, for example, servers, routers, network devices, other computing devices, etc. Examples of communication systems 480 include, but are not limited to, wireless communications systems, wired communications systems, cellular communications systems, radio frequency (RF) transmitter, receiver, and/or transceiver circuitry, a universal serial bus (USB), parallel, serial ports, etc.

The computing device 402 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include non-transitory computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 402. Any such computer storage media may be part of the computing device 402. Computer storage media may be tangible and non-transitory and does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The terminology used herein is for the purpose of describing particular examples only and is not intended to be limiting of the inventive concept. Also, unless explicitly stated, the embodiments described herein are not mutually exclusive. Aspects of the embodiments described herein may be combined in some implementations.

As used herein, the singular forms "a" and "an" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing examples of the inventive concept refers to "one or more embodiments of the present disclosure." Also, the term "exemplary" is intended to refer to an example or illustration. As used herein, the terms "use," "using," and "used" may be considered synonymous with the terms "utilize," "utilizing," and "utilized," respectively.

Although exemplary embodiments of smart airbag suspension systems have been specifically described and illustrated herein, many modifications and variations will be apparent to those skilled in the art. Accordingly, it is to be understood that the smart airbag suspension systems according to principles of this disclosure may be embodied other than as specifically described herein. The disclosure is also defined in the following claims, and equivalents thereof.

The description and illustration of one or more aspects provided in this application are intended to provide a thorough and complete disclosure of the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A suspension system for a vehicle, comprising:
an airbag having a first end and a second end opposite the first end along a longitudinal axis of the airbag;
a time-of-flight (ToF) sensor located in an internal cavity of the airbag, the ToF sensor configured to:
emit, at a first time, a signal from a location proximal to the first end of the airbag into an internal cavity of the airbag,
detect a reflection of the signal at a second time, and
output a value representing a distance between the first end and the second end based on an elapsed time between the first time and the second time;
an air supply coupler for coupling an air supply tube with the internal cavity through a portion of the airbag; and
a wire coupled to the ToF sensor and exiting the airbag through the air supply coupler, wherein the ToF sensor is configured to output the value via the wire.

2. The suspension system of claim 1, further comprising:
a pressure sensor located inside the internal cavity and configured to:
detect a pressure inside the airbag, and
output a pressure value representing the pressure.

3. The suspension system of claim 1, further comprising:
a wire coupled to the ToF sensor and to a communication bus of the vehicle, wherein the ToF sensor is configured to output the value via the wire.

4. The suspension system of claim 1, wherein the airbag is coupled to a compressor via a coupler that forms an airtight seal with the airbag.

5. The suspension system of claim 1, wherein the value is the elapsed time.

6. The suspension system of claim 1, wherein the wire exits the airbag through the air supply coupler into the tube.

7. The suspension system of claim 1, wherein the wire exits the airbag through the air supply coupler external to the tube.

8. The suspension system of claim 1, wherein the portion of the airbag is a rigid end of the airbag.

9. The suspension system of claim 1, wherein the portion of the airbag is a flexible side of the airbag.

10. A vehicle, comprising:

a computing device;

a chassis;

an axle;

a first airbag having a first top end coupled to the chassis and a first bottom end coupled to the axle; and a first time-of-flight (ToF) sensor configured to:

periodically emit a first signal at the first top end or the first bottom end of the first airbag, detect a corresponding first reflection for each emitted first signal, and output, to the computing device, a first plurality of values representing a plurality of distances between the first top end and the first bottom end of the first airbag based on corresponding elapsed times between when each first signal was emitted and when the corresponding first reflection was detected, wherein the computing device is configured to determine a characteristic of the vehicle based at least in part on one or more values of the first plurality of values.

11. The vehicle of claim 10, wherein determining the characteristic of the vehicle includes determining a distance rate of change between the first top end and the first bottom end of the first airbag.

12. The vehicle of claim 10, wherein the computing device is further configured to cause an adjustment to an air pressure of the first airbag based at least in part on the determined characteristic.

13. The vehicle of claim 10, further comprising:

a pressure sensor configured to:

detect a first pressure corresponding to a pressure inside the first airbag, and output, to the computing device, a pressure value representing the first pressure, wherein determining the characteristic of the vehicle includes determining a mass of the vehicle further based at least in part on the pressure value.

14. The vehicle of claim 10, further comprising:

a second airbag having a second top end coupled to the chassis and a second bottom end coupled to the axle; and a second ToF sensor configured to:

periodically emit a second signal at the second top end or the second bottom end of the second airbag, detect a corresponding second reflection for each emitted second signal, and output, to the computing device, a second plurality of values representing distances between the second top end and the second bottom end of the second airbag based on corresponding elapsed times between when each second signal was emitted and when the corresponding second reflection was detected, wherein the computing device is configured to determine the characteristic of the vehicle further based at least in part on the second plurality of values.

15. The vehicle of claim 10, wherein the plurality of values comprises the elapsed times.

16. The vehicle of claim 10, wherein the first ToF sensor is configured to output the first plurality of values to the computing device via a communication bus of the vehicle.

17. The vehicle of claim 10, further comprising a compressor coupled to the first airbag and configured to adjust an air pressure of the first airbag.

18. The vehicle of claim 10, wherein the computing device is configured to determine the plurality of distances based on the first plurality of values.

19. A suspension system for a vehicle, comprising:

an airbag having a first end and a second end opposite the first end along a longitudinal axis of the airbag, wherein the first end comprises a transparent window; and a time-of-flight (ToF) sensor configured to:

emit a signal through the transparent window into an internal cavity of the airbag at a first time, detect a reflection of the signal at a second time, and output a value representing a distance between the first end and the second end based on an elapsed time between the first time and the second time.

20. The suspension system of claim 19, wherein the transparent window and the ToF sensor are enclosed together within an enclosure that is configured to keep contaminants out of the enclosure.

* * * * *